United States Patent [19]

Kazmaier et al.

[11] Patent Number: 5,102,758
[45] Date of Patent: Apr. 7, 1992

[54] PROCESSES FOR THE PREPARATION OF PHTHALOCYANINES IMAGING MEMBER

[75] Inventors: Peter M. Kazmaier; Hai-Yen T. Tran; James M. Duff, all of Mississauga; James D. Mayo, Toronto; Gordon K. Hamer, Mississauga; Terry L. Bluhm, Oakville; Cheng K. Hsiao, Mississauga, all of Canada

[73] Assignee: Xerox Corporation, Stamford, Conn.

[21] Appl. No.: 734,984

[22] Filed: Jul. 23, 1991

Related U.S. Application Data

[62] Division of Ser. No. 533,265, Jun. 4, 1990.

[51] Int. Cl.⁵ .............................................. G03G 5/06
[52] U.S. Cl. ...................................... 430/58; 430/73; 430/76; 430/135
[58] Field of Search ...................... 430/58, 73, 76, 77, 430/78, 135; 540/140, 141

[56] References Cited

U.S. PATENT DOCUMENTS

| | | | |
|---|---|---|---|
| 4,728,592 | 3/1988 | Ohaku et al. | 430/76 |
| 4,731,312 | 3/1988 | Kato et al. | 430/58 |
| 4,882,427 | 11/1989 | Enokida et al. | 540/141 |
| 4,975,350 | 12/1990 | Fujimaki et al. | 430/73 |

*Primary Examiner*—John Goodrow
*Attorney, Agent, or Firm*—E. O. Palazzo

[57] ABSTRACT

A process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite, and recovering the phthalocyanine composite precipitated product.

6 Claims, 1 Drawing Sheet

PROCESSES FOR THE PREPARATION OF PHTHALOCYANINES IMAGING MEMBER

This is a division of application Ser. No. 533,265, filed June 4, 1990, pending.

BACKGROUND OF THE INVENTION

This invention is generally directed to processes for the preparation of phthalocyanines, and more specifically the present invention is directed to processes for obtaining mixtures or composites of titanyl phhthalocyanine polymorphs, including Type I, Type II, Type III, Type IV, and X polymorphs, reference for example copending application U.S. Ser. No. 533,261, the disclosure of which is totally incorporated herein by reference. In U.S. Pat. No. 4,898,799, the disclosure of which is totally incorporated herein by reference, there is disclosed, for example, the preparation of selected polymorphs of titanium phthalocyanines, and layered photoconductive members comprised of the prepared phthalocyanine composites. In one embodiment, the present invention is directed to a process for the preparation of composites of titanyl phthalocyanines and vanadyl phthalocyanines by suspending the vanadyl phthalocyanine in a solvent mixture of trifluoroacetic acid and methylene chloride; adding titanyl phthalocyanine to the stirring mixture; and thereafter precipitating the desired titanyl phthalocyanine and vanadyl phthalocyanine composite by, for example, adding with stirring the aforementioned mixture to water, separating the product therefrom by, for example, filtration, and washing the composite product obtained. The term "composite" refers in an embodiment of the present invention to separate or disparate parts or components, reference for example U.S. Pat. No. 4,607,124, the disclosure of which is totally incorporated herein by reference. Generally, the composite in an embodiment of the present invention is comprised of from about 95 to about 5 weight percent of the titanyl phthalocyanine, and from about 5 to about 95 weight percent of the second phthalocyanine, and preferably from about 95/5 to about 60/40, especially with a composite comprised of titanyl phthalocyanine and vanadyl phthalocyanine or other metal, or metal free phthalocyanine. The resulting composite phthalocyanine, especially those containing the titanyl phthalocyanine polymorph IV and Type X can be selected as organic photogenerator pigments in photoresponsive imaging members containing charge transport layers such as aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductor imaging members can be selected for a number of different known imaging and printing processes including, for example, electrophotographic imaging processes, especially xerographic processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source.

Processes for the preparation of titanyl phthalocyanine are known, however, many of them require the use of a strong acid, such as sulfuric acid, and these processes are not easily scalable; the aforementioned copending application for example. One process as illustrated in Konica Japanese Laid Open on Jan. 20, 1989 as 64-17066, the disclosure of which is totally incorporated herein by reference, involves the reaction of titanium tetrachloride and phthalodinitrile in an alpha-chloronaphthalene solvent to produce dichlorotitanium phthalocyanine, which is then subjected to hydroysis by ammonia water to enable alpha-type phthalocyanine. This phthalocyanine is preferably treated with an electron releasing solvent such as 2-ethoxyethanol, dioxane, lor N-methylpyrrolidinone, followed by subjecting the alpha-titanyl phthalocyanine to milling at a temperature of from 50° to 180° C. In a second method described in the aforementioned Japanese Publication, there is disclosed the preparation of alpha-type titanyl phthalocyanine with sulfuric acid. Another method for the preparation of alpha-titanyl phthalocyanine involves the addition of an aromatic hydrocarbon, such as dichlorobenzene, solvent to an aqueous suspension of the phthalocyanine, and heating, reference Japanese Laid Open 20365/1988, laid open on Jan. 28, 1988. In Japanese 171771/1986, laid open on Aug. 2, 1986, there is disclosed the purification of metalloxy phthalocyanine by treatment with N-methylpyrrolidinone. Imaging members with the above prepared prior art phthalocyanines are also known. Although the known processes are suitable for their intended purposes, there continues to be a need to provide photogenerators in which the process for preparing the desirable polymorph is scalable and simple to accomplish economically. Furthermore, there is a need to stabilize what is believed to be the excellent photoactive titanyl phthalocyanine polymorphs (Type IV and Type X) by the addition of other components whose concentration can be adjusted to achieve the appropriate balance between polymorph stability, photosensitivity, cycling lifetime, breadth of the spectral response in the IR region (to compensate for wavelength shifts on laser aging) and the like.

Generally layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanine, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

Photoresponsive imaging members with squaraine photogenerating pigments are also known, reference U.S. Pat. No. 4,415,639. In this patent, there is illustrated a photoresponsive imaging member with a substrate, a hole blocking layer, an optional adhesive interface layer, an organic photogenerating layer, a photoconductive composition capable of enhancing or reducing the intrinsic properties of the photogenerating layer, and a hole transport layer. As photoconductive compositions for the aforementioned member, there can be selected various squaraine pigments, including hydroxy squaraine compositions. Moreover, there is disclosed in U.S. Pat. No. 3,824,099 certain photosensitive hydroxy squaraine compositions.

The use of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is disclosed in this publication evaporated N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There is also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindinium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

Moreover, there is disclosed in U.S. Pat. No. 4,419,427 electrographic recording media with a photosemiconductive double layer comprised of a first layer containing charge carrier perylene diimide producing dyes, and a second layer with one or more compounds, which are charge transporting materials when exposed to light, reference the disclosure in column 2, beginning at line 20. Also of interest with respect to this patent is the background information included in columns 1 and 2, wherein perylene dyes of the formula illustrated are presented.

Furthermore, there is illustrated in copending application U.S. Pat. No. 4,514,482, entitled Photoconductive Devices Containing Perylene Dye Compositions, the disclosure of which is totally incorporated herein by reference, an ambipolar imaging member comprised of a supporting substrate, a photoconductive layer comprised of specific perylene dyes different than the perylene pigments of the present invention, which dyes are dispersed in a polymeric resinous binder composition; and as a top layer a specific aryl amine hole transporting substance dispersed in an inactive resinous binder.

In a copending application U.S. Ser. No. 537,714, the disclosure of which is totally incorporated herein by reference, there are illustrated photoresponsive imaging members with photogenerating titanyl phthalocyanine layers, including an alpha-titanyl phthalocyanine prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example U.S. Pat. No. 4,429,029 mentioned hereinbefore.

In copending application U.S. Ser. No. 533,261, the disclosure of which is totally incorporated herein by reference, there are illustrated X, Z-1 and Z-2 titanyl phthalocyanines and processes for the preparation of titanyl phthalocyanine polymorphs, which comprises the solubilization of a titanyl phthalocyanine in a mixture of trifluoroacetic acid and methylene chloride, precipitation of the desired titanyl phthalocyanine, such as Type IV, separation by, for example, filtration, and optionally subjecting the product to washing. The product can be identified by various known means including X-ray powder diffraction, XRPD. More specifically, in one aspect the aforementioned copending application discloses a process for the preparation of titanyl phthalocyanines which comprises a process for the preparation of titanyl phthalocyanine which comprises dissolving a titanyl phthalocyanine in a solution of trifluoroacetic acid and methylene chloride; adding the resultant solution to a solvent system that will enable precipitation; and separating the desired titanyl phthalocyanine from the solution followed by an optional washing.

In a copending application U.S. Ser. No. 537,740, the disclosure of which is totally incorporated herein by reference, there is illustrated a process which comprises adding a pigment to a solution of trihaloacetic acid and toluene; adding the solution to a nonsolvent for the pigment; and separating the product from the solution.

SUMMARY OF THE INVENTION

It is a feature of the present invention to provide processes for the preparation of composite titanyl phthalocyanines with many of the advantages illustrated herein.

It is yet another feature of the present invention to provide economically scalable processes for the preparation of mixtures of metal, metal free, or vandayl phthalocyanines, and titanyl phthalocyanines.

Another feature of the present invention relates to the preparation of mixtures of vanadium, zirconium, niobium, hafnium, tantalum metalloxy phthalocyanines, and the like, and titanyl phthalocyanine polymorphs, including those known as Type I, Type II, Type III, and Type IV. Also, there are provided in accordance with another feature of the present invention processes for the preparation of Type X phthalocyanines as disclosed in the copending application mentioned herein.

Further, another feature of the present invention relates to the preparation of photogenerating mixtures of vanadium, zirconium, niobium, hafnium, and tantalum metalloxy phthalocyanines and titanyl phthalocyanines by the solubilization of titanyl phthalocyanines and vanadium, zirconium, niobium, hafnium, and tantalum metalloxy phthalocyanines and coprecipitation of the mixture.

Moreover, another feature of the present invention relates to the preparation of mixtures of vanadium, zirconium, niobium, hafnium, and tantalum metalloxy phthalocyanines, and titanyl phthalocyanines with high purities of, for example, 95 percent in embodiments of the present invention.

Additionally, another feature of the present invention relates to the preparation of mixtures of vanadium, zirconium, niobium, hafnium, and tantalum metalloxy phthalocyanines, and titanyl phthalocyanines polymorphs in acceptable yields of, for example, exceeding about 75 percent in embodiments of the present invention.

Additionally, another feature of the present invention resides in processes wherein the phthalocyanines selected, such as vandayl phthalocyanine, are geometrically close in structure (to minimize or avoid in embodiments phase separation) to titanyl phthalocyanine, permitting them to isomorphically substitute into the crystal lattice and perturb the lattice slightly so as to stabilize the desired polymorph. The closeness between the phthalocyanines can be calculated using molecular mechanics calculations.

A further feature of the present invention resides in the provision of a photoresponsive imaging member with an aryl amine hole transport layer, and a photogenerator layer comprised of the photogenerating mixture composites obtained by the processes illustrated herein.

These and other features of the present invention are accomplished by the provision of processes for the preparation of mixtures of metal, metal free, or metalloxy phthalocyanines, such as vanadium, zirconium, niobium, hafnium, and tantalum metalloxy phthalocyanines and titanyl phthalocyanines, and photoresponsive imaging members thereof. More specifically, in one embodiment of the present invention there are provided processes for the preparation of mixtures of vanadyl phthalocyanine and titanyl phthalocyanine (TiOPc) polymorphs, which comprises the solubilization of vanadyl phthalocyanine in a mixture of trifluoroacetic acid and methylene chloride; adding to the mixture a titanyl phthalocyanine, precipitation of the desired phthalocyanine mixture, such as vanadyl phthalocyanine and titanyl phthalocyanine, or separation by, for example, filtration, and optionally subjecting the product mixture to washing. The product composite can be identified by various known means including X-ray powder diffraction (XRPD).

In embodiments of the present invention, there are provided processes for the preparation of phthalocyanine composites, which comprises a process for the preparation of phthalocyanine composites, which comprises adding a metal free phthalocyanine, a metal phthalocyanine, a metalloxy phthalocyanine or mixtures thereof to a solution of trifluoroacetic acid and a monohaloalkane, adding to the resulting mixture a titanyl phthalocyanine, adding the resulting solution to a mixture that will enable precipitation of said composite, and recovering the phthalocyanine composite precipitated product; a process for the preparation of phthalocyanine composites which comprises adding a metal free phthalocyanine, a metal phthalocyanine, a metalloxy phthalocyanine or mixtures thereof to a solution of trifluoroacetic acid and a polyhaloalkane, adding to the resulting mixture a titanyl phthalocyanine, adding the resulting solution to a mixture that will enable precipitation of said composite, and recovering the phthalocyanine composite precipitated product; a process for the preparation of phthalocyanine composites, which comprises adding a metal free phthalocyanine, a metal phthalocyanine, a metalloxy phthalocyanine or mixtures thereof to a solution of trifluoroacetic acid and a polyhaloalkane, adding to the resulting mixture a titanyl phthalocyanine, adding the resulting solution to a mixture that will enable precipitation of said composite, and recovering the phthalocyanine composite precipitated product from the solution; a process for the preparation of phthalocyanine composites, which comprises adding a metal free phthalocyanine, a metal phthalocyanine, a metalloxy phthalocyanine or mixtures thereof to a solution of trihaloacetic acid and a monohaloalkane, adding to the resulting mixture a titanyl phthalocyanine, adding the resulting solution to a mixture that will enable precipitation of said composite, and recovering the phthalocyanine composite precipitated product; and a process for the preparation of phthalocyanine composites, which comprises adding a metal free phthalocyanine, a metal phthalocyanine, a metalloxy phthalocyanine or mixtures thereof to a solution of trihaloacetic acid and a polyhaloalkane, adding to the resulting mixture a titanyl phthalocyanine, adding the resulting solution to a mixture that will enable precipitation of said composite, and recovering the phthalocyanine composite precipitated product.

One embodiment of the present invention is directed to a process for the preparation of mixtures of vanadyl phthalocyanine and titanyl phthalocyanine comprising the solubilization of vanadyl phthalocyanine in a mixture of trifluoroacetic acid and methylene chloride; adding to the mixture a titanyl phthalocyanine obtained from the reaction of titanium tetra(propoxide) with a mixture of phthalonitrile and diiminoisoindolene in N-methylpyrrolidinone solvent to provide Type I or $\beta$ Type titanyl phthalocyanine as determined by X-ray powder diffraction and XRPD; dissolving the resulting phthalocyanine composite in a mixture of trifluoroacetic acid and an alkylene halide, such as methylene chloride; adding the resulting mixture to a stirred alcohol, such as methanol solution, or to water; separating the resulting precipitate by, for example, vacuum through a 4.25 centimeter glass fiber paper in a Buchner funnel; and washing the phthalocyanine product.

Illustrative examples of phthalocyanines that can be selected for the processes of the present invention include metal free phthalocyanines, such as metal phthalocyanines, vandayl phthalocyaniness, and metalloxy phthalocyanines, such as zirconium, niobium, hafnium, and tantalum metalloxy phthalocyanines. The amount of each component in the resulting composite is from about 95/5 to about 5/95 mole percent of titanyl phthalocyanine and the second phthalocyanine, such as vanadyl phthalocyanine, and preferably from about 60/40 to 95/5.

As the solvent mixture, there can be selected trifluoroacetic acid and an alkylene halide, such as methylene chloride, alkyl mono and polyhalides with a carbon chain length of, for example, from 1 to about 0 carbons in effective amounts of from about 1 (trifluoroacetic acid): 10 parts by volume to about 10:1 parts by volume with, for example, a ratio of 1:4 being preferred. Also, other solvents such as toluene, THF, N-methylpyrrolidinone or chloroform may be selected as cosolvents.

Subsequent to solubilization with the above solvent mixture and stirring for an effective period of time of, for example, from about 10 minutes to about 24 hours the resulting mixture is added to a solution that will enable precipitation of the desired phthalocyanine mixture with a titanyl phthalocyanine, especially Type IV and X polymorphs, reference the copending application mentioned herein, which solution can be comprised of a mixture of an alcohol, such as methanol, ethanol, isopropanol in a range of 0 to 100 percent, and water followed by filtration of the phthalocyanine mixture, and washing with various solvents of, for example, water, methanol, acetone followed by washing with methanol, deionized water, and the like. The solid resulting composite can then be dried by, for example, heating at effective temperatures of, for example, from about 70° C. yielding a dark blue pigment mixture of titanyl phthalocyanine and, for example, a second metalloxy phthalocyanine selected from the group of vanadium, zirconium, niobium, hafnium and tantalum metalloxy phthalocyanines. When the precipitation is accomplished in solvents described in the copending application U.S. Ser. No. 533,261, the disclosure of which is totally incorporated herein by reference, such as trifluoroacetic acid and toluene, the composite can be obtained in polymorphs of Types I, II, III, IV or X depending, for example, on the appropriate nonsolvent mixture selected for the precipitation as illustrated in the aforementioned copending application.

Numerous different layered photoresponsive imaging members with the phthalocyanine pigments obtained by the processes of the present invention can be fabricated. In one embodiment, thus the layered photoresponsive imaging members are comprised of a supporting substrate, a charge transport layer, especially an aryl amine hole transport layer, and situated therebetween a photogenerator layer comprised of the composite phthalocyanine pigments illustrated herein. Another embodiment of the present invention is directed to positively charged layered photoresponsive imaging members comprised of a supporting substrate, a charge transport layer, especially an aryl amine hole transport layer, and as a top overcoating a vacuum evaporated composite of vanadyl phthalocyanine and titanyl phthalocyanine obtained with the processes of the present invention. Moreover, there is provided in accordance with the present invention an improved negatively charged photoresponsive imaging member comprised of a supporting substrate, a thin adhesive layer, a mixture of vanadyl phthalocyanine, and titanyl phthalocyanine, 50 weight percent, obtained by the processes of the present invention, photogenerator, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. Thus, for example, these imaging members can be prepared by dispersing the composite photogenerating pigment obtained with the process illustrated herein in a binder and coating on a supporting substrate with an adhesive layer thereon, and subsequently depositing by solution coating the hole transport layer.

Imaging members with the phthalocyanine photogenerating mixture pigments of the present invention are useful in various electrostatographic imaging and printing systems, particularly those conventionally known as xerographic processes. Specifically, the imaging members of the present invention are useful in xerographic imaging processes wherein the pigments absorb light of a wavelength of from about 600 nanometers to about 800 nanometers. In these known processes, electrostatic latent images are initially formed on the imaging member followed by development, and thereafter transfering and fixing the image to a suitable substrate.

Moreover, the imaging members of the present invention can be selected for electronic printing processes with gallium arsenide light emitting diode (LED) arrays which typically function at wavelengths of 660 nanometers.

BRIEF DESCRIPTION OF THE DRAWINGS

For a better understanding of the present invention and further features thereof, reference is made to the following detailed description of various preferred embodiments wherein.

DESCRIPTION OF THE PREFERRED EMBODIMENTS

Figure 1:
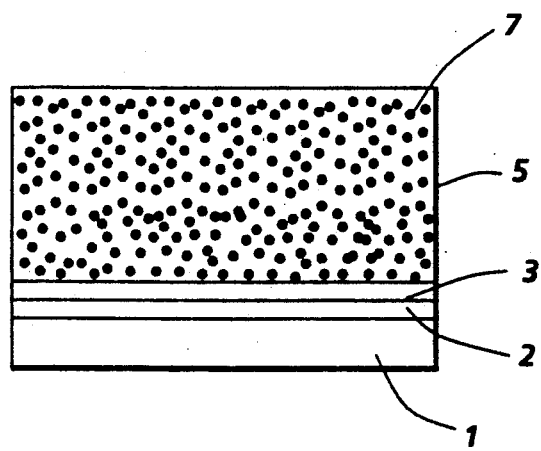
FIG. 1 is a partially schematic cross-sectional view of a negatively charged photoresponsive imaging member of the present invention.

Illustrated in FIG. 1 is a negatively charged photoresponsive imaging member of the present invention comprised of a supporting substrate 1, an adhesive layer 2, a photogenerating layer 3 comprised of the composites illustrated herein, such as a 50 weight percent dispersion of a TiOPc/VOPc (vanadyl phthalocyanine, 50 weight percent, and titanyl phthalocyanine, 50 weight percent), or a mixture composite with the X polymorph as obtained with the process of the present invention, reference Examples I to VIII that follow, and a hole transport layer 5, comprised of N,N'-diphenyl-N,N'-bis(3-methyl phenyl)-1,1'-biphenyl-4,4'-diamine, dispersed in a polycarbonate resinous binder 7.

Figure 2:
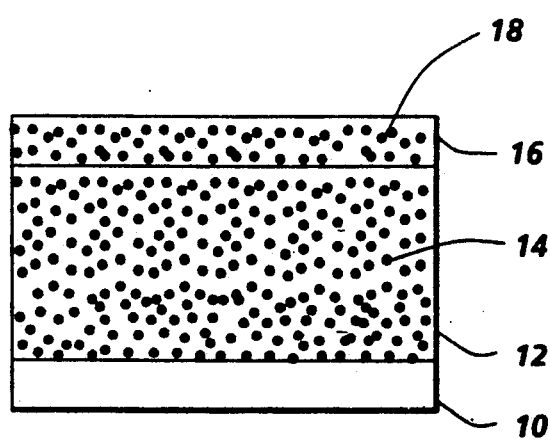
FIG. 2 is a partially schematic cross-sectional view of a positively charged photoresponsive imaging member of the present invention.

Illustrated in FIG. 2 is a positively charged photoresponsive imaging member of the present invention comprised of a supporting substrate 10, a charge transport layer 12 comprised of N,N'-diphenyl-N,N'-bis(3-methyl phenyl)-1,1'-biphenyl-4,4'-diamine, dispersed in a polycarbonate resinous binder 14, and a photogenerator layer 16 comprised of a mixture of vanadyl phthalocyanine, 60 weight percent, and 40 weight percent of titanyl phthalocyanine Type IV or Type X obtained with the process of the present invention, reference Examples I to VIII, optionally dispersed in an inactive resinous binder 18.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as Mylar a commercially available polymer; Mylar containing 100 Angstroms or more titanium; a layer of an organic material having a semiconductive surface layer such as indium tin oxide or aluminum arranged thereon, or a conductive material inclusive of aluminum, chromium, nickel, brass or the like. The substrate may be flexible or rigid and many have a number of many different configurations, such as for example a plate, a cylindrical drum, a scroll, an endless flexible belt and the like. Preferably, the substrate is in the form of a seamless flexible belt. In some situations, it may be desirable to coat on the back of the substrate, particularly when the substrate is a flexible organic polymeric material, an anticurl layer, such as for example polycarbonate materials commercially available as Makrolon.

The thickness of the substrate layer depends on many factors, including economical considerations, thus this layer may be of substantial thickness, for example, over 3,000 microns, or of minimum thickness providing there are no adverse effects on the system. In one preferred embodiment, the thickness of this layer is from about 75 microns to about 300 microns.

With further regard to the imaging members, the photogenerator layer is preferably comprised of 100 percent of the mixture of phthalocyanine pigments obtained with the processes of the present invention, which pigments may optionally be dispersed in resinous binders. Generally, the thickness of the photogenerator layer depends on a number of factors including the thicknesses of the other layers, and the amount of photogenerator material contained in this layer. Accordingly, this layer can be of a thickness of from about 0.05 micron to about 10 microns when the phthalocyanine photogenerator mixture composition is present in an amount of from about 5 percent to about 100 percent by volume. Preferably, this layer is of a thickness of from about 0.25 micron to about 1 micron, when the photogenerator composition is present in this layer in an amount of 50 percent by volume. The maximum thickness of this layer is dependent primarily upon factors such as photosensitivity, electrical properties and mechanical considerations.

Illustrative examples of polymeric binder resinous materials that can be selected for the photogenerator composite pigment include those polymers as disclosed in U.S. Pat. No. 3,121,006, the disclosure of which is totally incorporated herein by reference, polyesters, polyvinyl butyral, Formvar®, polycarbonate resins, polyvinyl carbazole, epoxy resins, phenoxy resins, especially the commercially available poly(hydroxyether) resins, and the like.

As adhesives there can be selected various known substances inclusive of polyesters such as those commercially available from E. I. DuPont as 49,000 polyesters. This layer is of a thickness of from about 0.05 micron to 1 micron. Siloxanes as illustrated in U.S. Pat. No. 4,808,506, the disclosure of which is totally incorporated herein by reference, can also be selected for the imaging members referenced herein.

Aryl amines that can be selected for the hole transporting layer, which generally is of a thickness of from about 5 microns to about 75 microns, and preferably of a thickness of from about 10 microns to about 40 microns, include molecules of the following formula:

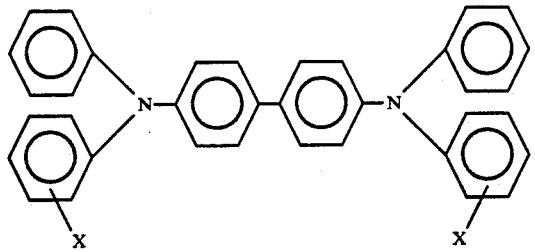

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known hole transporting compounds may be selected.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, subsequently transfering the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated. Titanyl phthalocyanine was synthesized according to the procedure illustrated herein and more specifically in the copending application U.S. Ser. No. 533,261, the disclosure of which is totally incorporated herein by reference. Vanadyl phthalocyanine, which is commercially available, can be synthesized as described in U.S. Pat. No. 4,771,133, the disclosure of which is totally incorporated herein by reference. Overnight, as used in the working Examples, refers to about 18 hours unless otherwise indicated.

The following examples are being supplied to further define various species of the present invention, it being noted that these examples are intended to illustrate and not limit the scope of the present invention. Parts and percentages are by weight unless otherwise indicated.

EXAMPLE I

Molecular Mechanics Calculations

A computer simulated representation of titanyl phthalocyanine was constructed using a molecular mechanics program, PCMODEL available from Serena Software, Bloomington, Ind. The geometry was optimized to provide the lowest molecular mechanics energy. Similarly, optimized geometries were calculated for metalloxy phthalocyanines of vanadium, zirconium, niobium, hafnium and tantalum. The geometries of each of these phthalocyanines were compared to the reference titanyl phthalocyanine by taking an atom to atom difference in the coordinates and summing these differences. The sum is then divided by the number of atoms to achieve an average deviation. An average deviation of less than about 0.2 Angstrom is considered acceptable and indicates that the phthalocyanine has geometric requirements which allow it to isomorphically substitute into the titanyl phthalocyanine lattice in these embodiments. All of the phthalocyanines shown in Table 1 satisfy this criterion with the most acceptable situation occurring, it is believed, for tantalum. Individual coordinate differences are also shown in Table 1 for the oxygen atoms, the metal atoms and the coordinating phthalocyanine nitrogens.

TABLE 1

A Comparison of the Optimized Geometries of Metalloxy Phthalocyanines to TIOPc

| Pc | $N1^a$ | $M^a$ | $O^a$ | Average Molecular Deviation For All Atoms$^a$ |
|---|---|---|---|---|
| TiOPc | 0.00 | 0.00 | 0.00 | 0.00 |
| VOPc | 0.063 | 0.092 | 0.178 | 0.043 |
| ZrOPc | 0.171 | 0.660 | 0.790 | 0.179 |
| NbOPc | 0.032 | 0.072 | 0.070 | 0.050 |
| HfOPc | 0.168 | 0.657 | 0.788 | 0.179 |
| TaOPc | 0.00 | 0.002 | 0.002 | 0.001 |

$^a$Computed by the coordinate difference between TiOPc and MOPc.

EXAMPLE II

Synthesis of Phthalocyanine Composites TiOPc/VOPc

VOPc (vanadyl phthalocyanine) (101 milligrams) was dissolved in a mixture of trifluoroacetic acid/methylene chloride (1:4 by volume; 119 milliliters) and stirred overnight, 18 hours. Later, in a separate container, TiOPc Type I polymorph (1,900 milligrams) was dissolved in a mixture of trifluoroacetic acid/methylene chloride (1:4 by volume; 119 milliliters) and stirred for 2 hours. After combining the solutions and filtering through a 0.5 micron Millipore PTFE filter (no residue was obtained), the solution was added dropwise to 2 liters of 1:1 methanol/water (v/v). The resulting deep blue precipitate was isolated by filtration and air dried to constant weight. The product yield was 1.820 g (grams). The X-ray powder diffraction indicated that the resulting composite mixture had diffraction peaks indicative of the titanyl phthalocyanine Type X polymorph, reference copending application U.S. Ser. No. 533,261, the disclosure of which is totally incorporated herein by reference, demonstrating that the vanadyl phthalocyanine resided in the Type X lattice. The product contained approximately 5 mole percent VOPc in the TiOPc/VOPc composite. The mole percent of VOPc was calculated by dividing the moles of VOPc in a sample by the total moles of VOPc and TiOPc in the sample. Solid state visible and near infrared absorption data of a solid dispersion of this product indicated that the absorption was broadened with respect to pure titanyl IV phthalocyanine. The X-ray powder diffraction spectrum together with Cu K (alpha) radiation (lambda=0.1542 nanometer) showed peaks at two theta values of 7.2±0.02, 14.1±0.02, 17.8±0.02, 24.0±0.02, 27.2±0.02, and 28.8±0.02 degrees. These values correspond to d spacings of 12.3, 6.28, 4.98, 3.71, 3.28 and 3.10 Angstroms, respectively, and indicate that the above prepared composite comprises vandayl pthalocyanine residing in the X polymorph crystal lattice.

EXAMPLE III

Synthesis of Phthalocyanine Composites TiOPc/VOPc

VOPc (204 milligrams) was dissolved in a mixture of trifluoroacetic acid/methylene chloride (1:4 by volume; 121 milliliters) and stirred overnight. Later, in a separate container, TiOPc (1,900 milligrams) was dissolved in a mixture of trifluoroacetic acid/methylene chloride (1:4 by volume; 119 milliliters) and stirred overnight. After combining the solutions and filtering through a 0.5 micron Millipore PTFE filter (no residue was obtained) the solution was added dropwise to 2 liters of 1:1 methanol/water (v/v). The deep blue precipitate was isolated by filtration and dried to constant weight. Yield was 1.720 grams. The X-ray powder diffraction showed that the composite had diffraction peaks indicative of the titanyl phthalocyanine Type X polymorph, demonstrating that the vanadyl phthalocyanine resided in the Type X lattice. The product contained approximately 10 mole percent of VOPc in the TiOPc/VOPc composite. Solid state visible and near infrared absorption data of a solid dispersion of this sample indicated that the absorption was broadened with respect to pure titanyl phthalocyanine. The X-ray powder diffraction spectrum taken with Cu K (alpha) radiation (lambda=0.1542 nanometer) showed peaks at two-theta values of 7.2±0.02, 14.1±0.02, 17.8±0.02, 24.0±0.02, 27.2±0.02, and 28.8±0.02 degrees. These values correspond to d spacings of 12.3, 6.28, 4.98, 3.71, 3.28 and 3.10 Angstroms, respectively, and indicate that this composite resides in the X polymorph, that is the above prepared composite comprises vandayl pthalocyanine residing in the X polymorph crystal lattice.

EXAMPLE IV

Synthesis of Phthalocyanine Composites

VOPc (324 milligrams) was dissolved in a mixture of trifluoroacetic acid/methylene chloride (1:4 by volume; 240 milliliters) and stirred overnight. Later, in a separate container, TiOPc (1,700 milligrams) was dissolved in a mixture of trifluoroacetic acid/methylene chloride (1:4 by volume; 119 milliliters) and stirred overnight. After combining the solutions and filtering through a 0.5 micron Millipore PTFE filter (58 milligrams of VOPc were recovered on filtration) the solution was added dropwise to 2 liters of 1:1 methanol/water (v/v). The deep blue precipitate was isolated by filtration and dried to constant weight. Yield was 1.760 grams. The X-ray powder diffraction showed that the composite had diffraction peaks indicative of the titanyl phthalocyanine Type X polymorph, demonstrating that the vanadyl phthalocyanine resided in the Type X lattice. The product contained approximately 14 mole percent VOPc in the TiOPc/VOPc composite. Solid state visible and near infrared absorption data of a solid dispersion of this sample indicated that the absorption was broadened with respect to pure titanyl phthalocyanine. The X-ray powder diffraction spectrum taken with Cu K (alpha) radiation (lambda=0.1542 nanometers) showed peaks at two theta values of 7.2±0.02, 14.1±0.02, 17.8±0.02, 24.0±0.02, 27.2±0.02, and 28.8±0.02 degrees. These values correspond to d spacings of 12.3, 6.28, 4.98, 3.71, 3.28 and 3.10 Angstroms, respectively, and indicate that this composite resides in the X polymorph.

EXAMPLE V

Synthesis of Phthalocyanine Composites

VOPc (428 milligrams) was dissolved in a mixture of trifluoroacetic acid/methylene chloride (1:4 by volume; 240 milliliters) and stirred overnight. Later, in a separate container, TiOPc (1,610 milligrams) was dissolved in a mixture of trifluoroacetic acid/methylene chloride (1:4 by volume; 119 milliliters) and stirred overnight. After combining the solutions and filtering through a 0.5 micron Millipore PTFE filter (218 milligrams of VOPc was recovered on filtration) the solution was added dropwise to 2 liters of 1:1 methanol/water (v/v). The deep blue precipitate was isolated by filtration and dried to constant weight. Yield was 1.406 grams. The X-ray powder diffraction showed that the composite had diffraction peaks indicative of the titanyl phthalocyanine Type X polymorph demonstrating that the vanadyl phthalocyanine resided in the Type X lattice. The product contained approximately 11.5 mole percent VOPc in the TiOPc/VOPc composite. Solid state visible and near infrared absorption data of a solid dispersion of this sample indicated that the absorption was broadened with respect to pure titanyl phthalocyanine. The X-ray powder diffraction spectrum taken with Cu K (alpha) radiation (lambda=0.1542 nanometer) showed peaks at two theta values of $7.2\pm0.02$, $14.1\pm0.02$, $17.8\pm0.02$, $24.0\pm0.02$, $27.2\pm0.02$, and $28.8\pm0.02$ degrees. These values correspond to d spacings of 12.3, 6.28, 4.98, 3.71, 3.28 and 3.10 Angstroms, respectively, and indicate that this composite resides in the X polymorph.

EXAMPLE VI

Synthesis of Phthalocyanine Composites

VOPc (2,030 milligrams) was dissolved in a mixture of trifluoroacetic acid/methylene chloride (1:4 by volume; 500 milliliters) and stirred overnight (18 hours for all the Examples unless otherwise indicated). After filtration (1,310 grams of VOPc were recovered), TiOPc (2,000 milligrams) was added to the VOPc solution and stirring was continued for another 4 hours. The solution was concentrated to 250 milliliters under reduced pressure. After filtering through a 0.5 micron Millipore PTFE filter (another 226 milligrams of VOPc were recovered on filtration) the solution was added dropwise to 3 liters of 1:1 methanol/water (v/v). The deep blue precipitate was isolated by filtration and dried to constant weight. Yield was 2.4 grams. The product contained approximately 26 mole percent VOPc in the TiOPc/VOPc composite.

EXAMPLE VII

Synthesis of Phthalocyanine Composites

VOPc (1,032 milligrams) was dissolved in a mixture of trifluoroacetic acid/methylene chloride (1:4 by volume; 500 milliliters) and stirred overnight (18 hours). In a separate container, TiOPc (1,106 milligrams) was dissolved in a mixture of trifluoroacetic acid/methylene chloride (1:4 by volume; 200 milliliters) and stirred overnight. Both solutions were filtered through 0.5 micron Millipore PTFE filters (no residue was obtained for the TiOPc solution but 60 milligrams of VOPc was recovered from the filtration) and the combined solutions were added dropwise to 2 liters of 1:1 methanol/water (v/v). The deep blue precipitate was isolated by filtration and dried to constant weight. Yield was 1.95 grams. The product contained approximately 46 mole percent VOPc in the TiOPc/VOPc composite.

EXAMPLE VIII

Synthesis of VOPc Phthalocyanine-Control Example

VOPc (1,050 milligrams) was dissolved in a mixture of trifluoroacetic acid/methylene chloride (1:4 by volume; 500 milliliters) and stirred overnight. After filtration through a 0.5 micron Millipore PTFE filters (40 milligrams of VOPc were recovered from the filtration) and the solution was added dropwise to 2 liters of 1:1 methanol/water (v/v). The deep blue precipitate was isolated by filtration and dried to constant weight. Yield was 0.92 gram. X-ray powder diffraction indicates that the VOPc without composite formation was not in the Type X polymorph and the diffraction peaks were different from previous examples. This indicates that composite formation is important for the stabilization of the Type X structure when VOPc is present in the matrix.

EXAMPLE IX

A photoresponsive imaging member was prepared by providing an aluminized Mylar substrate in a thickness of 75 microns, and a Nylon 8 blocking layer in a thickness of 0.6 micron and applying thereto with a multiple clearance film applicator a dispersion of 50 percent by weight of the composite obtained from the process of Example III and 50 percent by weight of polyvinylbutyral in n-butyl acetate.

Thereafter, the above photogenerating layer was overcoated with an amine hole transport layer prepared as follows:

A transport layer with 60 percent by weight of PC(Z), a polycarbonate resin, was mixed with 40 percent by weight of N,N'-diphenyl-N,N'-bis(3-methylphenyl)-1,1'-biphenyl-4,4'-diamine, 19 percent by weight in chlorobenzene in an amber bottle. The resulting mixture was then coated in a dry thickness of 25 microns on top of the above photogenerating layer using a multiple clearance film applicator (8 mils wet gap thickness). The resulting member was then dried in a forced air oven at 115° C. for 60 minutes.

The photosensitivity of this member was then determined by electrostatically charging the surface thereof with a corona discharge source until the surface potential, as measured by a capacitively coupled probe attached to an electrometer, attained an initial dark value $V_O$ of $-800$ volts. The front surface of the charged member was then exposed to light from a filtered Xenon lamp, XBO 75 watt source, allowing light in the wavelength range of 780 to 800 nanometers to reach the member surface. The exposure causing reduction of the surface potential to half its initial value, $E_{\frac{1}{2}}$, and the percent discharge of surface potential due to various exposure energies was then determined. The photosensitivity can be determined in terms of the exposure in ergs/cm$^2$ necessary to discharge the member from the initial surface potential to half that value. The higher the photosensitivity, the smaller the exposure energy required to discharge the layer to 50 percent of the surface potential. At 800 nanometers exposure, the $E_{\frac{1}{2}}$ value was found to be 1.1 erg/cm$^2$, and the percent discharge at an exposure level of 5 erg/cm$^2$ was 82.

EXAMPLE X

A photoresponsive device was prepared as described in Example VIII except a composite pigment obtained from Example IV was used to prepare the photogenerating layer. At 800 nonometers exposure, the $E_{\frac{1}{2}}$ value was found to be 1.3 erg/cm$^2$, and the percent discharge at an exposure level of 5 erg/cm$^2$ was 80.

Other modifications of the present invention may occur to those skilled in the art based upon a review of the present application and these modifications, including equivalents thereof, are intended to be included within the scope of the present invention.

What is claimed is:

1. An imaging member comprised of a photogenerating layer comprised of the composite obtained by a process which comprises adding a metal free phthalocyanine, a metal phthalocyanine, a metalloxy phthalocyanine or mixtures thereof to a solution of trifluoroacetic acid and a monohalolkane; adding to the resulting mixture a titanyl phthalocyanine; adding the resulting solution to a mixture that will enable precipitation of said composite, and recovering the phthalocyanine composite precipitated product, and a charge transport layer.

2. An imaging member comprised of a supporting substrate, a photogenerating layer comprised of the composite obtained by a process which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite, and recovering the phthalocyanine composite precipitated product, and a hole transport layer.

3. An imaging member in accordance with claim 2 wherein said solution is comprised of trifluoroacetic acid and a polyhaloalkane.

4. An imaging member in accordance with claim 2 wherein vanadyl phthalocyanine is added to the solution of trifluoroacetic acid and a monohaloalkane.

5. An imaging member in accordance with claim 3 wherein vanadyl phthalocyanine is added to the solution of trifluoroacetic acid and a polyhaloalkane.

6. An imaging member comprised of a supporting substrate, a photogenerating layer comprised of the composite obtained by a process which comprises adding a metal free phthalocyanine, a metal phthalocyanine, a metalloxy phthalocyanine or mixtures thereof to a solution of trihaloacetic acid and a polyhaloalkane; adding to the resulting mixture a titanyl phthalocyanine; adding the resulting solution to a mixture that will enable precipitation of said composite; and recovering the phthalocyanine composite precipitated product, and a hole transport layer.

* * * * *